United States Patent
Yamaoka

(10) Patent No.: US 9,665,328 B2
(45) Date of Patent: May 30, 2017

(54) IMAGE RECORDING SYSTEM, IMAGE RECORDING APPARATUS, NON-TRANSITORY STORAGE MEDIUM STORING INSTRUCTIONS EXECUTABLE BY IMAGE RECORDING APPARATUS, MOBILE TERMINAL, AND NON-TRANSITORY STORAGE MEDIUM STORING INSTRUCTIONS EXECUTABLE BY MOBILE TERMINAL

(71) Applicant: Hiroyuki Yamaoka, Kasugai (JP)

(72) Inventor: Hiroyuki Yamaoka, Kasugai (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 673 days.

(21) Appl. No.: 14/169,867

(22) Filed: Jan. 31, 2014

(65) Prior Publication Data
US 2014/0213190 A1    Jul. 31, 2014

(30) Foreign Application Priority Data

Jan. 31, 2013  (JP) ................................ 2013-017853

(51) Int. Cl.
*G06F 3/12* (2006.01)
*H04W 76/02* (2009.01)
*H04W 88/06* (2009.01)

(52) U.S. Cl.
CPC .......... *G06F 3/1292* (2013.01); *G06F 3/1204* (2013.01); *G06F 3/1236* (2013.01); *H04W 76/023* (2013.01); *H04W 88/06* (2013.01)

(58) Field of Classification Search
CPC . G03G 15/5075; G06F 3/1292; G06F 3/1204; G06F 3/1236; H04W 76/023; H04W 88/06
See application file for complete search history.

(56) References Cited

U.S. PATENT DOCUMENTS

| | | | |
|---|---|---|---|
| 8,958,100 B2* | 2/2015 | Nishikawa | H04W 4/008 358/1.14 |
| 9,036,192 B2* | 5/2015 | Watanabe | G06F 3/1212 358/1.13 |

(Continued)

FOREIGN PATENT DOCUMENTS

| | | |
|---|---|---|
| JP | 10-207658 A | 8/1998 |
| JP | 2004-234594 A | 8/2004 |

(Continued)

OTHER PUBLICATIONS

Chinese Office Action issued in related CN application No. 201410043346.X, mailed Mar. 11, 2016.

*Primary Examiner* — Gregory H Curran
(74) *Attorney, Agent, or Firm* — Merchant & Gould P.C.

(57) ABSTRACT

An image recording system includes a mobile terminal and an image recording apparatus. Having received device-specific information about the mobile terminal through first wireless communication, the image recording apparatus determines whether the image recording apparatus is to communicate with the mobile terminal through second wireless communication. When the image recording apparatus is not to communicate with the mobile terminal through the second wireless communication, the image recording apparatus transmits non-communication information to the mobile terminal through the first wireless communication. When having received the non-communication information through the first wireless communication, the mobile terminal transmits object image data to a server through the second wireless communication or first alternative communication. The image recording apparatus then receives the object image data from the server through the second wireless communication or second alternative communica- (Continued)

tion and controls a recording device to record an image based on the object image data.

14 Claims, 7 Drawing Sheets

(56) References Cited

U.S. PATENT DOCUMENTS

2002/0042264 A1 4/2002 Kim
2011/0292445 A1 12/2011 Kato

FOREIGN PATENT DOCUMENTS

JP 2006-279140 A 10/2006
JP 2010-241114 A 10/2010

\* cited by examiner

IMAGE RECORDING SYSTEM, IMAGE
RECORDING APPARATUS,
NON-TRANSITORY STORAGE MEDIUM
STORING INSTRUCTIONS EXECUTABLE
BY IMAGE RECORDING APPARATUS,
MOBILE TERMINAL, AND
NON-TRANSITORY STORAGE MEDIUM
STORING INSTRUCTIONS EXECUTABLE
BY MOBILE TERMINAL

CROSS REFERENCE TO RELATED
APPLICATION

The present application claims priority from Japanese Patent Application No, 2013-017853, which was filed on. Jan. 31, 2013, the disclosure of which is herein incorporated by reference in its entirety.

BACKGROUND OF THE INVENTION

Field of the Invention

The present invention relates to an image recording apparatus and a mobile terminal for recording an image on a recording medium, an image recording system including the image recording apparatus and the mobile terminal, and a non-transitory storage medium storing a plurality of instructions executable by a computer of one of the image recording apparatus and the mobile terminal.

Description of the Related Art

There is known a technique in which when image data stored in mobile terminal is transmitted to a printer and printed, device-specific information is first exchanged between the mobile terminal and the printer through radio or wireless communication using Near Field Communication (NFC) that is a contactless IC standard, and then image data is transferred in a state in which another wireless communication is established between the mobile terminal and the printer using a communication standard allowing data transfer with higher speed such as Wireless Fidelity (W-Fi) and Bluetooth.

SUMMARY OF THE INVENTION

In the above-described technique, device-specific information about the printer such as its IP address is transmitted to mobile terminals during communication using the communication standard, e.g., Wi-Fi and Bluetooth. In general, a network printer can be controlled by a mobile terminal which transmits a command containing the device-specific information of the network printer as a destination address. Examples of this control include: printing; obtaining a file stored in a storage; and editing various settings such as print settings and a network setting for the network printer. Thus, it is not preferable in terms of security for the printer to reply the device-specific information to all the mobile terminals, but if reply of the device-specific information to the mobile terminal is limited, the printer cannot execute printing.

This invention has been developed to provide: a mobile terminal capable of causing an image recording apparatus to print image data stored in the mobile terminal even in a situation in which wireless communication cannot be established between the mobile terminal and the image recording apparatus based on device-specific information; an image recording apparatus capable of printing image data stored in the mobile terminal in such a situation; an image recording system including the mobile terminal and the image recording apparatus; a non-transitory storage medium storing a plurality of instructions executable by a computer of the image recording apparatus; and a non-transitory storage medium storing a plurality of instructions executable by a computer of the mobile terminal.

The present invention provides an image recording system including: a mobile terminal; and an image recording apparatus configured to record an image on a recording medium. The mobile terminal includes: a first storage configured to store one or more sets of image data; a second storage configured to store device-specific information about the mobile terminal; a mobile-terminal-side first communication device configured to perform first wireless communication that is established when a distance between a sender device and a receiver device is equal to or less than a communicable distance; a mobile-terminal-side second communication device configured to perform second wireless communication that is established based on device-specific information about a sender device and a receiver device and that is greater in communication speed than the first wireless communication; and a first controller. The image recording apparatus includes: a recording device configured to record an image on the recording medium based on the image data; a third storage configured to store apparatus-specific information about the image recording apparatus; an image-recording-apparatus-side first communication device configured to perform the first wireless communication; an image-recording-apparatus-side second communication device configured to perform the second wireless communication; and a second controller. The first controller of the mobile terminal is configured to: control the mobile-terminal-side first communication device to perform the first wireless communication; control the mobile-terminal-side second communication device to perform the second wireless communication; select at least one set of image data from among the one or more sets of image data stored in the first storage, as object image data based on which an image is to be recorded on the recording medium; transmit the device-specific information about the mobile terminal which is stored in the second storage, to the image recording apparatus through the first wireless communication; and after the object image data is selected, transmit the object image data to one of the image recording apparatus and a server that is communicable with the image recording apparatus and the mobile terminal. The second controller of the image recording apparatus is configured to: control the image-recording-apparatus-side first communication device to perform the first wireless communication; control the image-recording-apparatus-side second communication device to perform the second wireless communication; when the device-specific information about the mobile terminal is received by the image recording apparatus through the first wireless communication, determine whether the image recording apparatus is to communicate with the mobile terminal through the second wireless communication; when the second controller has determined that the image recording apparatus is to communicate with the mobile terminal through the second wireless communication, transmit the apparatus-specific information about the image recording apparatus to the mobile terminal through the first wireless communication; and when the second controller has determined that the image recording apparatus is not to communicate with the mobile terminal through the second wireless communication, transmit non-communication information to the mobile terminal through the first wireless communication, the non-communication information indicating that the image recording apparatus is not to communicate with the mobile terminal through the second wireless communication. The first controller of the mobile terminal is configured to: when the mobile terminal has received the apparatus-specific information about the image recording apparatus through the first wireless communication, transmit the object image data to the image recording apparatus through the second wireless communication; and when the mobile terminal has received the non-communication information through the first wireless communication, transmit the object image data to the server through one of the second wireless communication and first alternative communication that differs from each of the first wireless communication and the second wireless communication. The second controller of the image recording apparatus is configured to: when the second controller has determined that the image recording apparatus is to communicate with the mobile terminal through the second wireless communication, after transmission of the apparatus-specific information about the image recording apparatus to the mobile terminal, receive the object image data from the mobile terminal through the second wireless communication and control the recording device to record an image based on the object image data received from the mobile terminal; and when the second controller has determined that the image recording apparatus is not to communicate with the mobile terminal through the second wireless communication, after transmission of the non-communication information to the mobile terminal through the first wireless communication, receive the object image data from the server through one of the second wireless communication and second alternative communication that differs from each of the first wireless communication, the second wireless communication, and the first alternative communication and control the recording device to record an image based on the object image data received from the server. It is noted that the first storage and the second storage may or may not be separate from each other.

The present invention also provides an image recording apparatus including: a recording device configured to record an image on a recording medium based on image data; a storage configured to store apparatus-specific information about the image recording apparatus; a first communication device configured to perform first wireless communication that is established when a distance between a sender device and a receiver device is equal to or less than a communicable distance; a second communication device configured to perform second wireless communication that is established based on device-specific information about a sender device and a receiver device and that is greater in communication speed than the first wireless communication; and a controller. The controller is configured to: control the first communication device to perform the first wireless communication; control the second communication device to perform the second wireless communication; when the first communication device has received device-specific information about a mobile terminal that communicates with the image recording apparatus, determine whether the image recording apparatus is to communicate with the mobile terminal through the second wireless communication; when the second controller has determined that the image recording apparatus is to communicate with the mobile terminal through the second wireless communication, after transmission of the apparatus-specific information about the image recording apparatus to the mobile terminal through the first wireless communication, receive object image data from the mobile terminal through the second wireless communication and control the recording device to record an image based on the object image data received from the mobile terminal; and when the second controller has determined that the image recording apparatus is not to communicate with the mobile terminal through the second wireless communication, transmit, to the mobile terminal through the first wireless communication, non-communication information indicating that the image recording apparatus is not to communicate with the mobile terminal through the second wireless communication and after transmission of the non-communication information to the mobile terminal, receive the object image data from the server through one of the second wireless communication and alternative communication that differs from each of the first wireless communication and the second wireless communication and control the recording device to record an image based on the object image data received from the server.

The present invention also provides a non-transitory storage medium storing a plurality of instructions executable by a computer of an image recording apparatus. The image recording apparatus includes a recording device configured to record an image on a recording medium based on image data; a storage configured to store apparatus-specific information about the image recording apparatus; a first communication device configured to perform first wireless communication that is established when a distance between a sender device and a receiver device is equal to or less than a communicable distance; and a second communication device configured to perform second wireless communication that is established based on device-specific information about a sender device and a receiver device and that is greater in communication speed than the first wireless communication. The plurality of instructions, when executed by the computer, cause the image recording apparatus to: control the first communication device to perform the first wireless communication; control the second communication device to perform the second wireless communication; when the image recording apparatus has received device-specific information about a mobile terminal that communicates with the image recording apparatus, determine whether the image recording apparatus is to communicate with the mobile terminal through the second wireless communication; when the image recording apparatus has determined that the image recording apparatus is to communicate with the mobile terminal through the second wireless communication, transmit the apparatus-specific information about the image recording apparatus to the mobile terminal through the first wireless communication and after transmission of the apparatus-specific information about the image recording apparatus to the mobile terminal, receive object image data from the mobile terminal through the second wireless communication and control the recording device to record an image based on the object image data received from the mobile terminal; and when the image recording apparatus has determined that the image recording apparatus is not to communicate with the mobile terminal through the second wireless communication, transmit, to the mobile terminal through the first wireless communication, non-communication information indicating that the image recording apparatus is not to communicate with the mobile terminal through the second wireless communication and after transmission of the non-communication information to the mobile terminal, receive the object image data from the server through one of the second wireless communication and alternative communication that differs from each of the first wireless communication and the second wireless communication and control the recording device to record an image based on the object image data received from the server.

The present invention also provides a mobile terminal including: a first storage configured to store one or more sets of image data: a second storage configured to store device-specific information about the mobile terminal; a first communication device configured to perform first wireless communication that is established when a distance between a sender device and a receiver device is equal to or less than a communicable distance; a second communication device configured to perform second wireless communication that is established based on device-specific information about a sender device and a receiver device and that is greater in communication speed than the first wireless communication; and a controller. The controller is configured to: control the first communication device to perform the first wireless communication; control the second communication device to perform the second wireless communication; select at least one set of image data from among the one or more sets of image data stored in the first storage, as object image data based on which an image is to be recorded on a recording medium; transmit the device-specific information about the mobile terminal which is stored in the second storage, to an image recording apparatus through the first wireless communication; when the mobile terminal has received the apparatus-specific information about the image recording apparatus from the image recording apparatus through the first wireless communication, transmit the object image data to the image recording apparatus through the second wireless communication; and when the mobile terminal has received, from the image recording apparatus through the first wireless communication, non-communication information indicating that communication between the image recording apparatus and the mobile terminal is not to be performed through the second wireless communication, transmit the object image data to a server communicable with the image recording apparatus, through one of the second wireless communication and alternative communication that differs from each of the first wireless communication and the second wireless communication.

The present invention also provides a non-transitory storage medium storing a plurality of instructions executable by a computer of a mobile terminal. The mobile terminal includes: a first storage configured to store one or more sets of image data; a second storage configured to store device-specific information about the mobile terminal; a first communication device configured to perform first wireless communication that is established when a distance between a sender device and a receiver device is equal to or less than a communicable distance; and a second communication device configured to perform second wireless communication that is established based on device-specific information about a sender device and a receiver device and that is greater in communication speed than the first wireless communication. The plurality of instructions, when executed by the computer, cause the mobile terminal to: control the first communication device to perform the first wireless communication; control the second communication device to perform the second wireless communication; select at least one set of image data from among the one or more sets of image data stored in the first storage, as object image data based on which an image is to be recorded on a recording medium; transmit the device-specific information about the mobile terminal which is stored in the second storage, to an image recording apparatus through the first wireless communication; when the mobile terminal has received the apparatus-specific information about the image recording apparatus from the image recording apparatus through the first wireless communication, transmit the object image data to the image recording apparatus through the second wireless communication; and when the mobile terminal has received, from the image recording apparatus through the first wireless communication, non-communication information indicating that communication between the image recording apparatus and the mobile terminal is not to be performed through the second wireless communication, transmit the object image data to a server communicable with the image recording apparatus, through one of the second wireless communication and alternative communication that differs from each of the first wireless communication and the second wireless communication.

BRIEF DESCRIPTION OF THE DRAWINGS

The objects, features, advantages, and technical and industrial significance of the present invention will be better understood by reading the following detailed description of the embodiment of the invention, when considered in connection with the accompanying drawings, in which.

DETAILED DESCRIPTION OF THE EMBODIMENT

Hereinafter, there will be described an image processing system according to one embodiment of the present invention by reference to the drawings. The present embodiment is achieved by applying the present invention to an image processing system including: a multi-function peripheral (MFP) having a printing function; and a mobile device capable of accepting a print job for causing the MFP to perform a printing operation.

<Overall Configuration of Image Processing System>

Figure 1:
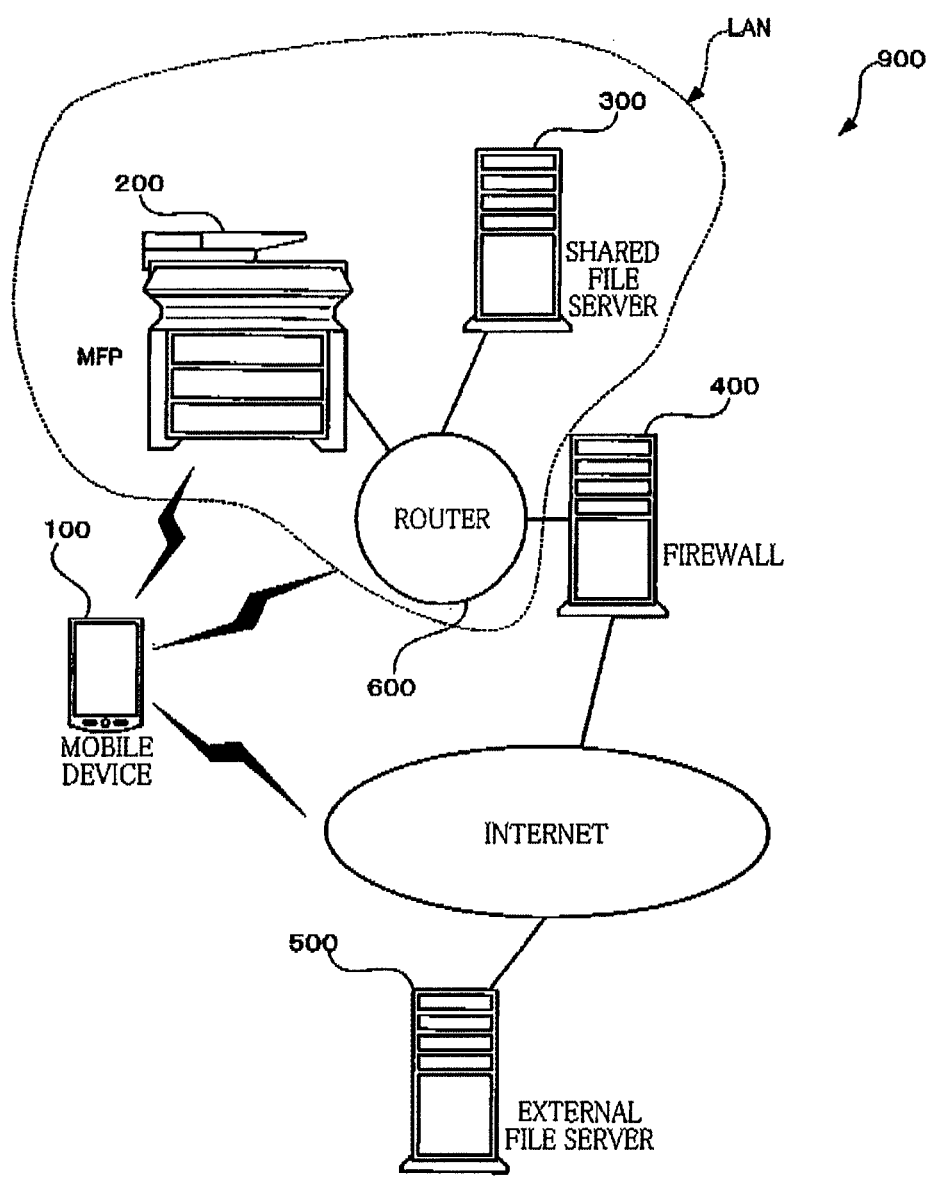
FIG. 1 is a schematic view illustrating a configuration of an image processing system according to one embodiment of the present invention.

As illustrated in FIG. 1, an image processing system 900 according to the present embodiment includes: a mobile device 100 configured to output a print job to an MFP designated by the mobile device 100; and an MFP 200 (as one example of an image processing device and an image recording apparatus) having a printing function and an image reading function (i.e., a scanner). The MFP 200 is connected to a router 600 in a company LAN network. Connected to the router 600 are not only the MIT 200 but also a plurality of terminals, not shown, and a shared file server 300, and these devices can communicate with each other. The MFP 200 and the terminals can be connected to an internet via a firewall 400. The mobile device 100 can directly transmit or receive data to or from the MFP 200 through wireless (radio) communication according to a standard such as NFC and Wi-Fi Direct which will be explained below. Also, the mobile device 100 can be connected to the LAN through wireless communication using Wi-Fi only in a case where the mobile device 100 can be certified. Also, the mobile device 100 can be connected to the internet over a public mobile phone network. An external file server 500 is connected to the internet.

The MFP 200 may be a device having a color printing function or a device having a monochrome-only printing function. The present MFP 200 is a device having a color printing function. Also, the MFP 200 may include an electronic photographic printer or an ink-jet printer. Also, the MFP 200 may be a device having a color reading function or a device having a monochrome-only reading function. The present MFP 200 is a device having a color reading function. Also, any of a CCD and a CIS may be employed for a reading device.

<Structure of MFP>

Figure 2:
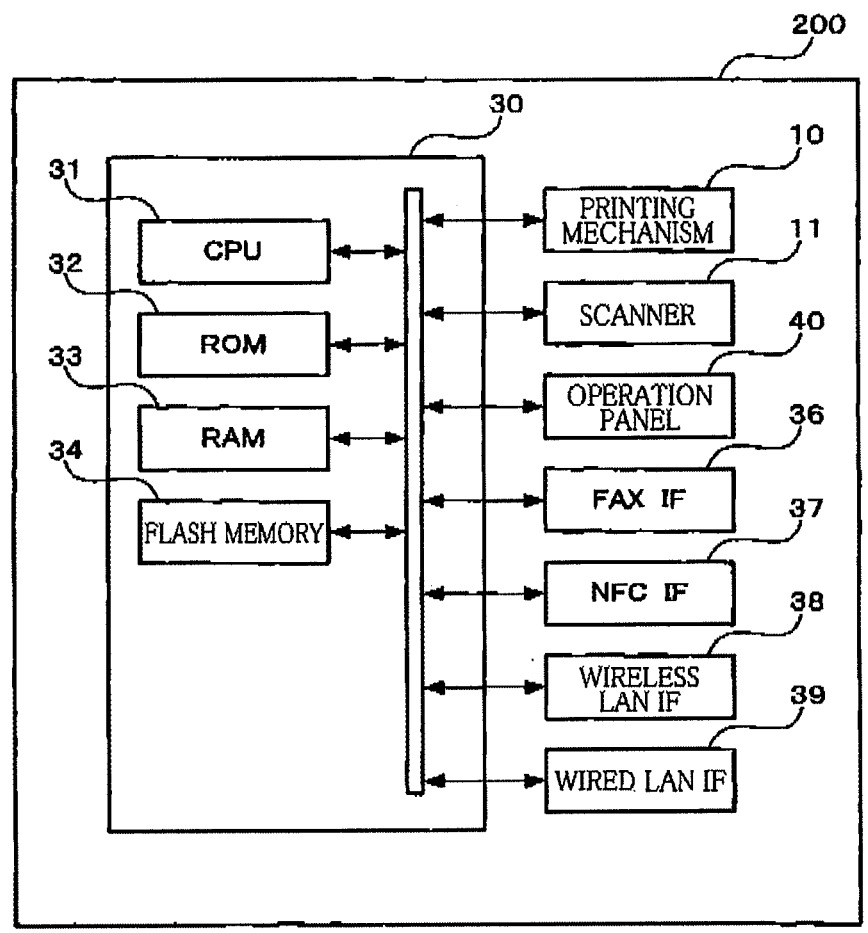
FIG. 2 is a functional block diagram of a multi-function peripheral (MFP) illustrated in FIG. 1.

There will be next explained a general structure of the MFP 200. As illustrated in FIG. 2, the MFP 200 includes a controller 30 that includes: a CPU 31; a ROM 32; a RAM 33; and a flash memory 34. Also, the controller 30 is electrically connected to: a printing mechanism (as one example of a recording unit) 10 configured to print an image on a sheet; a scanner 11 configured to read an image of a document; an operation panel 40 configured to display an operating state of the MFP 200 and accept an input of a user; a FAX interface 36; an NFC interface 37 (as one example of an image-recording-apparatus-side first communication device); a wireless LAN interface 38 (as one example of an image-recording-apparatus-side second communication device); and a wired LAN interface 39.

The ROM 32 stores firmware as control programs for controlling the MFP 200, various settings, initial values, and other similar data. The RAM 33 and the flash memory 34 are used as a working area from which the control programs are read or as a storage area for temporarily storing data. The flash memory 34 stores device-specific information about the MFP 200 such as an IP address.

According to the control programs read from the ROM 32 and signals received from various sensors, the CPU 31 controls the components of the MFP 200 while storing results of processings into the RAM 33 or the flash memory 34.

The FAX interface 36 enables communication between the MFP 200 and an external device, not shown, over a public network. The MFP 200 receives data from the external device via the FAX interface 36. Also, the MFP 200 transmits data to the external device via the FAX interface 36.

The NFC interface 37 enables NFC wireless communication (i.e., wireless communication using an NFC standard as one example of first wireless communication) according to ISO/IEC 21481 or ISO/IEC 18092. The MFP 200 transmits or receives data to or from the external device via the NFC interface 37.

The wireless LAN interface 38 enables Wi-Fi Direct (WFD) wireless communication (as one example of second wireless communication) according to IEEE 802.11 and standards equivalent to it. The NEC and the WFD differ from each other in communication method, i.e., standard of wireless communication. Specifically, WFD offers a longer communication distance and a higher communication rate (speed) than NFC. The MFP 200 transmits and receives data to or from the external device via the wireless LAN interface 38. The wireless LAN interface 38 can be connected to the router 600 through Wi-Fi wireless communication. These structures enable data communication between the MFP 200 and various devices connected to the LAN, via the wireless LAN interface 38 over the LAN. It is noted that the wired LAN interface 39 can be connected to the router 600 over wired communication (as one example of second alternative communication or alternative communication). The MFP 200 can perform data communication with various devices connected to the LAN, also via the wired LAN interface 39.

It is noted that WFD is a communication method which establishes a network including: a group owner device that controls the network; and a client device or devices to enable data transfer in the network. Thus, in order for the MFP 200 to perform data communication with the external device via the wireless LAN interface 38, the MFP 200 needs to establish wireless communication with the external device to construct a WFD network. In the present embodiment, the MFP 200 acts as a group owner device when constructing the WFD network, and the mobile device 100 acts as a client device. The client device is not limited to only the mobile device 100, and other devices can belong to the WFD network as client devices. The MFP 200 stores: device-specific information about the client device; and WFD connection information for establish WFD wireless communication (i.e., wireless communication using WFD) with the client device. The WFD connection information includes: a service set identifier (SSID) for identifying the WFD network; a password; and the device-specific information such as the IP address of the MFP 200.

The operation panel 40 is provided with: an input portion constituted by various buttons for accepting input of the user; a screen for displaying messages and contents of settings; and the NFC interface 37 acting as an NFC reader for accepting the NFC communication. During an ON state of a power source of the MFP 200, the MFP 200 continues to detecting a device with which the NFC wireless communication can be performed, using signals transmitted from the NFC interface 37. Accordingly, when the user has placed the mobile device 100 near the NFC interface 37, the MFP 200 detects the mobile device 100, so that NFC communication between the mobile device 100 and the MFP 200 is allowed. It is noted that placing the mobile device 100 near the NFC interface 37 means bringing the mobile device 100 into a communication range of the NFC interface 37, and the mobile device 100 and the NFC interface 37 may or may not be touched together.

<Structure of Mobile Device>

Figure 3:
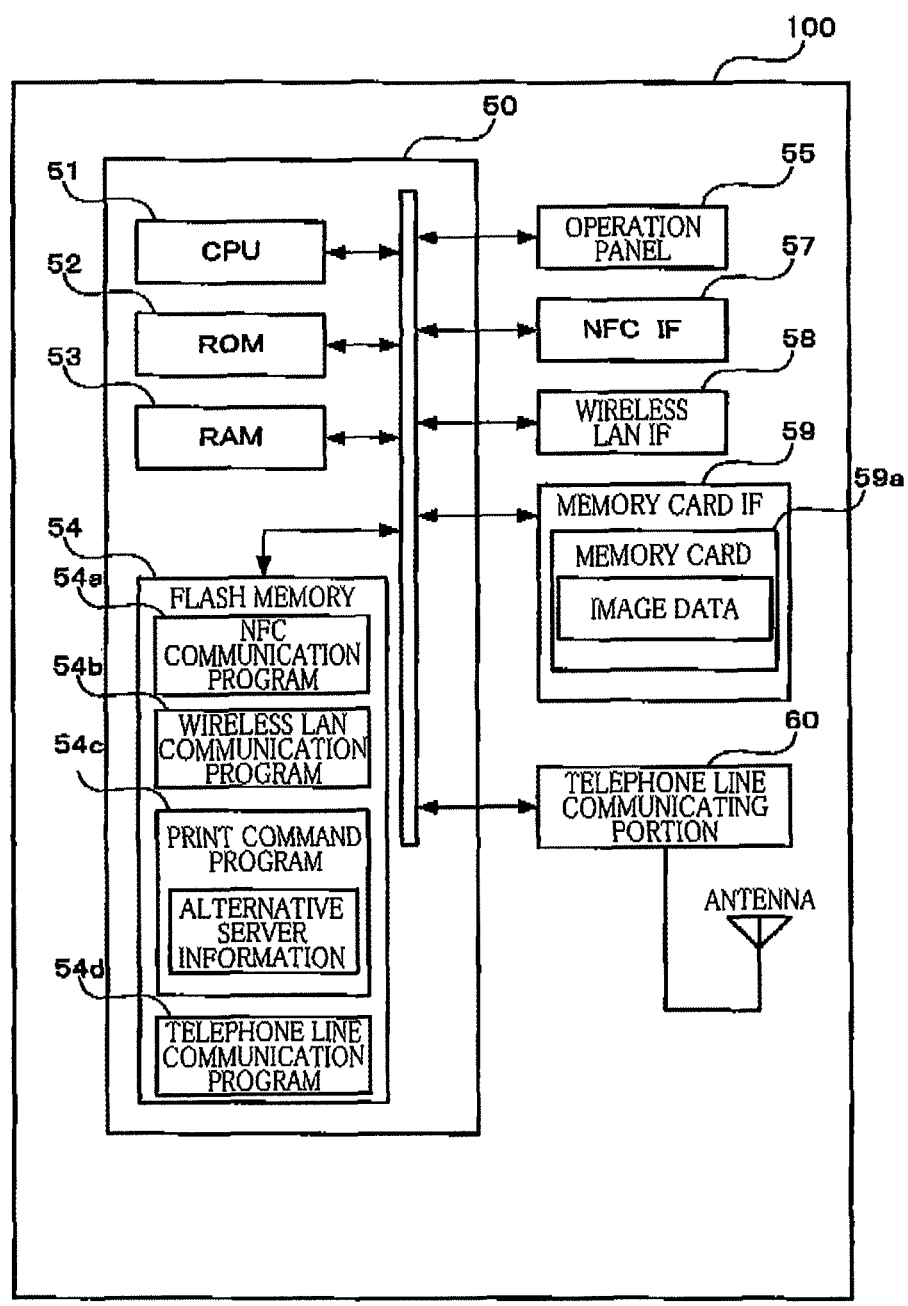
FIG. 3 is a functional block diagram of a mobile device illustrated in FIG. 1.

There will be next explained a general structure of the mobile device 100. As illustrated in FIG. 3, the mobile device 100 includes a controller 50 that includes: a CPU 51; a ROM 52; a RAM 53; and a flash memory 54 (as one example of a second storage). The mobile device 100 further includes: an operation panel 55 in the form of a touch panel having a display function and an input function; an NFC interface 57 (as one example of a mobile-terminal-side first communication device) and a wireless LAN interface 58 (as one example of a mobile-terminal-side second communication device) each as a communication interface that enables communication with an external device; a memory card interface 59 on which a memory card 59a (as one example of a first storage) can be removably mounted; and a telephone line communicating portion 60 (as one example of a third communication device) that enables data transfer via a public mobile phone network. These devices are controlled by the controller 50. The memory card 59a stores image data owned by the user.

The NFC interface 57 enables NFC wireless communication like the NFC interface 37 of the MFP 200. The wireless LAN interface 58 enables Wi-Fi or WFD wireless communication like the wireless LAN interface 38 of the MFP 200.

An OS, a browser for viewing files on the internet, device drivers for controlling various devices, and the like are installed in the flash memory 54 of the mobile device 100. Also, the flash memory 54 stores: the device-specific information containing personal information of the user and an IP address relating to the mobile device 100; and various applications for operating the mobile device 100. These applications include: an NFC communication program 54a which uses the NFC interface 57 to perform NFC data communication; a wireless LAN communication program 54b which uses the wireless LAN interface 58 to perform Wi-Fi or WFD communication; a print command program 54c which creates a print job that causes the MFP 200 to perform printing based on image data stored in the mobile device 100; and a telephone line communication program 54d which uses a telephone line communicating portion 60 to perform data communication over a public switched telephone network (PSTN) (as one example of first alternative communication or alternative communication).

The print command program 54c is designed to create print data based on image data to be printed which is selected by the user. The print command program 54c then creates a print job for causing the printer to perform printing based on the print data and registers the created print job into a job queue of the mobile device 100. It is noted that the creation of the print data is performed by a printer driver stored in the flash memory 54.

Also, the print command program 54c stores alternative server information. The alternative server information is information about file servers which can be used when a print job is transmitted from the mobile device 100 to the MFP 200. When WED connection is allowed based on the device-specific information, the print command program 54c can transmit the print job from the mobile device 100 to the MFP 200 through WFD communication via the wireless LAN communication program 54b. When the WED connection is not allowed, the print command program 54c performs indirect transmission of the print job via the alternative server to which both of the mobile device 100 and the MFP 200 can be connected. In the present embodiment, the shared file server 300 and the external file server 500 are stored as the alternative server information. Therefore, when the WFD connection is not allowed based on the device-specific information, the print command program 54c inquires of the MFP 200 whether the shared file server 300 is connectable or not, that is, whether the shared file server 300 can be used as the alternative server or not. When the shared file server 300 is not connectable, the print command program 54c inquires of the MFP 200 whether the external file server 500 is connectable or not, that is, whether the external file server 500 can be used as the alternative server or not. The print command program 54c determines the connectable file server as the alternative server and uploads the print job to the alternative server through Wi-Fi communication. The print command program 54c uses NFC to send the MFP 200 a URL (as one example of an address information) obtained from the server when the print job is uploaded. The MFP 200 uses the obtained URL to access the alternative server via the wireless LAN interface 38 or the wired LAN interface 39 to download the print job. When no file server is connectable, an error is issued, and the print job is deleted.

The CPU 51 executes various processings while storing results of calculations into the RAM 53 or the flash memory 54 according to the control programs read from the ROM 52 and the programs read from the flash memory 54. The above-described operations of the applications are also controlled or processed by the CPU 51.

<Overview of Print Command Program>

Figure 4:
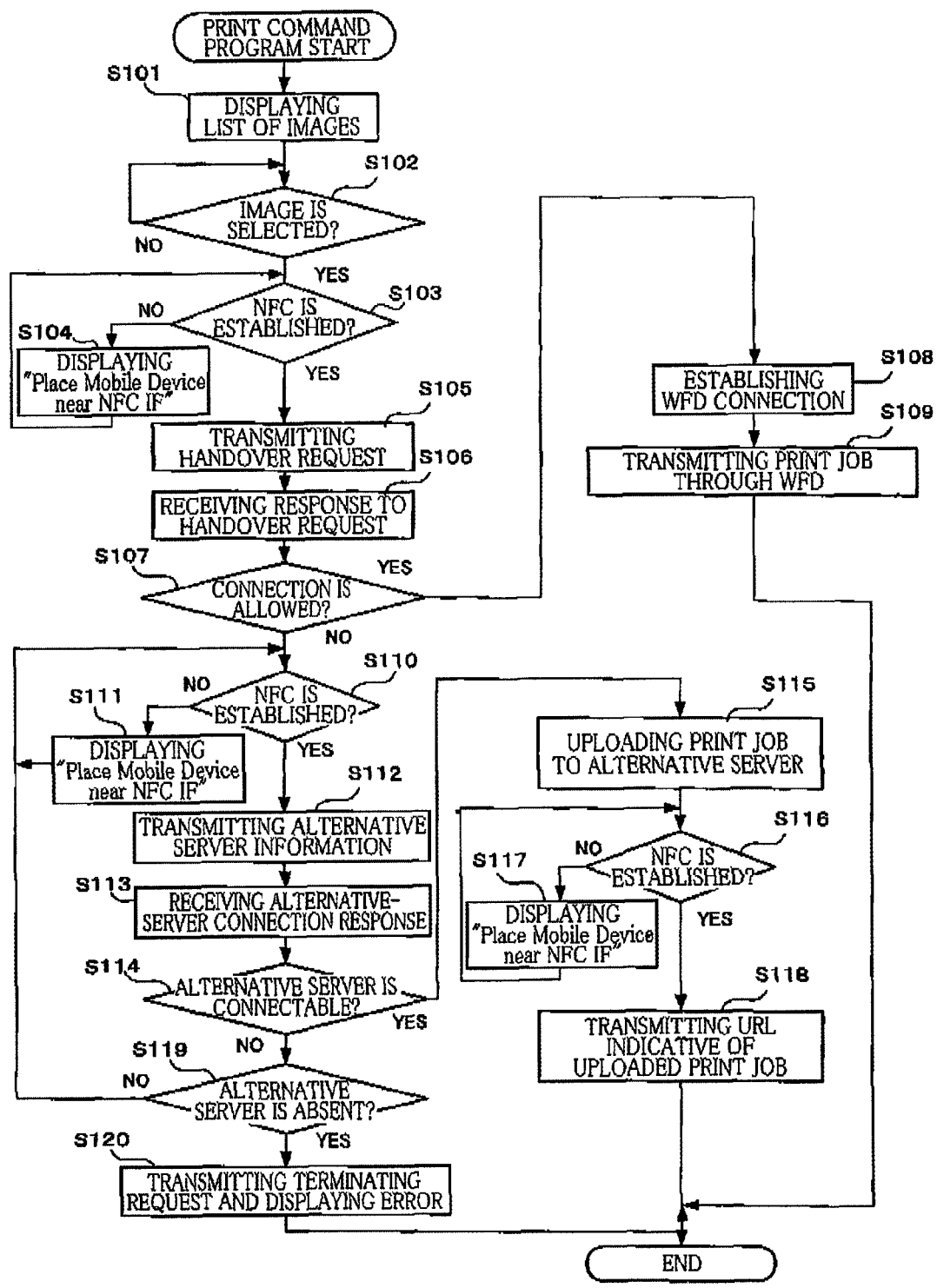
FIG. 4 is a flow chart illustrating a procedure of a print processing to be executed by the mobile device illustrated in FIG. 1.

There will be next explained, with reference to FIG. 4, processings to be executed by the CPU 51 according to the print command program 54c installed on the mobile device 100. The CPU 51 activates the print command program 54c when having received from the user a command for activating the print command program 54c.

The flow in FIG. 4 begins with S101 at which the CPU 51 controls the operation panel 55 to display, as an initial screen, a list of images based on the image data stored in the memory card 59a, by file names or thumbnail images. The user then selects image data to be printed from the list of images based on the image data (S102: YES).

When the image data to be printed is selected, the CPU 51 creates print data based on the selected image data and creates a print job for causing the printer to print the print data and registers the print job into the job queue of the mobile device 100. These operations establish a state in which the mobile device 100 can transmit the print job to the MFP 200.

When the user places the mobile device 100 near the NFC interface 37 of the MFP 200 in the state in which the print job is registered in the mobile device 100, the MFP 200 detects the mobile device 100, and NFC wireless communication is established between the mobile device 100 and the MFP 200. The CPU 51 at S103 determines whether the NFC wireless communication has been established or not. When the NFC wireless communication is not established (S103: NO), the CPU 51 at S104 controls the operation panel 55 to display a message "Place Mobile Device Near NFC IF" to prompt the user to bring the mobile device 100 into close proximity of the NFC interface 37 of the MFP 200.

When the NFC wireless communication is established (S103: YES), the CPU 51 at S105 uses NFC to transmit a request of handover from the mobile device 100 to the MFP 200. The request of handover contains not only a command representative of a request of handover to WFD but also the device-specific information stored in the flash memory 54. Also, the request of handover may contain group names as needed. The CPU 51 at S106 receives a response to the handover request from the MFP 200.

When having received the request of handover from the mobile device 100, the MFP 200 determines based on the device-specific information whether the mobile device 100 is allowed to establish connection or not. For example, when the device-specific information indicates that the user does not belong to a department to which the MFP 200 belongs, the MFP 200 determines that the mobile device 100 is not allowed to establish the connection. The MFP 200 sends the mobile device 100 a response to the handover request which contains a command indicating whether the mobile device 100 is allowed to establish WFD connection with the MFP 200 or not This response to the handover request is transmitted using NFC. When the WFD connection is allowed, the response to the handover request contains the WFD connection information for switching to the WFD connection.

The CPU 51 at S107 determines whether the WFD wireless connection is allowed or not based on a command contained in the response to the handover request received from the MFP 200. When the WFD wireless connection is allowed (S107: YES), the CPU 51 at 5108 uses the WFD connection information contained in the response to the handover request to establish WFD wireless communication with the MFP 200. That is, a handover is performed from the NFC wireless communication to the WFD wireless communication to switch a communication method used for data communication. After the WFD wireless communication with the MFP 200 is established, the CPU 51 at S109 uses WFD to send the MFP 200 the print job registered in the mobile device 100.

When having received the print job, the MFP 200 starts printing the print data contained in the print job. Upon completion of printing of all pages, the WFD connection with the MFP 200 is disconnected, and the flow in FIG. 4 ends. On the other hand, when the WFD wireless connection is not allowed (S107: NO), the CPU 51 controls the operation panel 55 to display a message indicating that the transmission of the print job through WFD has failed, and the NFC communication is temporarily stopped.

To establish NFC connection again, the CPU 51 at S110 determines again whether the NFC wireless communication has been established or not. When the NFC wireless communication is not established (S110: NO), the CPU 51 at S111 controls the operation panel 55 to display the message "Place Mobile Device Near NFC IF" to prompt the user to bring the mobile device 100 into close proximity of the NFC interface 37 of the MFP 200.

When the NFC wireless communication is established (S110; YES), the CPU 51 at S112 selects alternative server information having a higher priority from the stored alternative server information and uses NFC to transmit the selected alternative server information from the mobile device 100 to the MFP 200. While the alternative server information about the shared file server 300 and the alternative server information about the external file server 500 are stored in the present embodiment, the priority of the shared file server 300 is higher than that of the external file server 500. Accordingly, the alternative server information about the shared file server 300 is first transmitted from the mobile device 100 to the MFP 200. The MFP 200 determines whether the alternative server specified by the received alternative server information is connectable or not. The MFP 200 uses NFC to send the mobile device 100 an alternative-server connection response that contains, when the alternative sewer is connectable, a command indicating that the alternative server is connectable and, when the alternative server is not connectable, a command indicating that the alternative server is not connectable. The CPU 51 at S113 receives the alternative-server connection response transmitted from the MFP 200.

The CPU 51 at S114 determines whether the MFP 200 is connectable to the alternative server or not based on a command contained in the alternative-server connection response received by the MFP 200. When the CPU 51 determines that the MFP 200 is connectable to the alternative server (S114: YES), the CPU 51 at S115 uploads the print job to the alternative server specified by the alternative server information. At S115, the CPU 51 temporarily stops the NFC communication, and when uploading the print job to the shared file server 300, the CPU 51 connects the mobile device 100 to the shared file server 300 on the LAN through Wi-Fi using the wireless LAN communication program, and when uploading the print job to the external file server 500, the CPU 51 connects the mobile device 100 to the external file server 500 via the telephone line communicating portion 60 over the public switched telephone network. Upon completion of the upload of the print job, the CPU 51 receives a URL for obtaining the uploaded print job, from the shared file server 300 or the external file server 500 to which the print job has been uploaded. This URL may differ from an address of a computer to which the CPU 51 had been connected when uploading the print job. In this case, a URL is determined after the upload of the print job. That is, a URL can be obtained only after the upload.

After the completion of the upload of the print job, the CPU 51 at S116 determines again whether the NEC wireless communication has been established or not to establish NFC connection again. When the NFC wireless communication is not established (S116: NO), the CPU 51 at S117 controls the operation panel 55 to display the message "Place Mobile Device Near NFC IF" to prompt the user to bring the mobile device 100 into close proximity of the NFC interface 37 of the MFP 200. When the NFC wireless communication is established (S116: YES), the CPU 51 at S118 uses NEC to send the MFP 200 the URL obtained upon the completion of the upload of the print job. When having received the print job, the MFP 200 starts printing the print data contained in the print job. Upon completion of printing of all pages, the MFP 200 transmits a print completion response to the mobile device 100, and the flow in FIG. 4 ends.

On the other hand, when the CPU 51 determines that the MFP 200 is not connectable to the alternative server, based on the command contained in the received alternative-server connection response (S114: NO), the CPU 51 at S119 determines whether or not there is an alternative server (i.e., the next alternative server) whose priority is lower than that of the alternative server having the higher priority. When the next alternative server is present (S119: NO), this flow returns to S110. When the next alternative server is absent (S119: YES), the CPU 51 at S120 sends the MFP 200 a terminating request containing a command that indicates that there is no alternative server. At S120, the CPU 51 also displays an error on the operation panel 55, and the flow in FIG. 4 ends.

<Print Processing>

Figure 5:
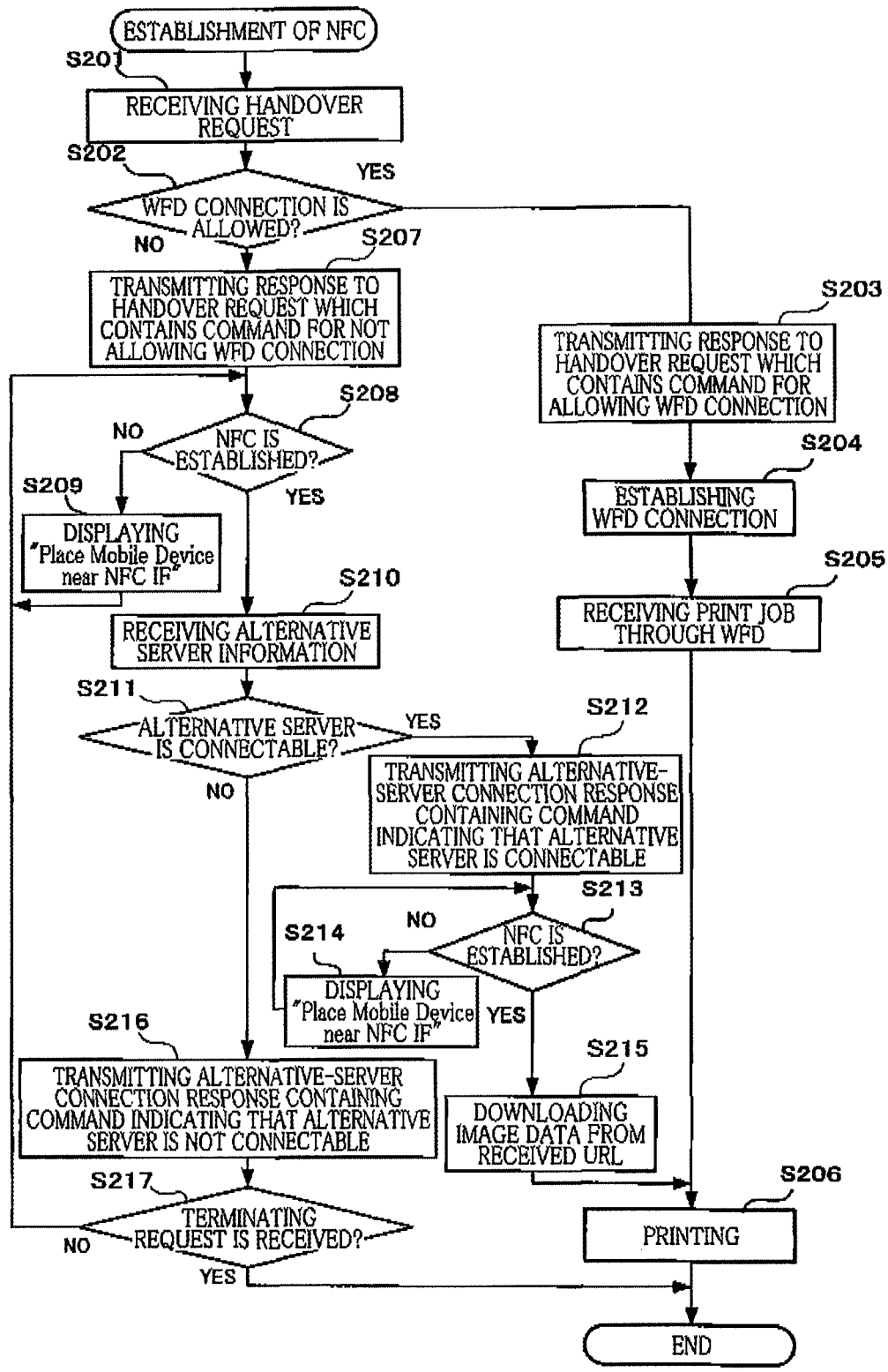
FIG. 5 is a flow chart illustrating a procedure of a print processing to be executed by the MFP illustrated in FIG. 1.

There will be next explained, with reference to FIG. 5, a print processing that is executed by the CPU 31 of the MFP 200 when the NFC wireless communication between the mobile device 100 and the MFP 200 is established in the state in which the print job is registered in the mobile device 100. As illustrated in FIG. 5, when the NFC wireless communication is established, the CPU 31 at S201 receives the request of handover which is transmitted using NFC from the mobile device 100 to the MFP 200. When having received the request of handover from the mobile device 100, the CPU 31 at S202 determines based on the device-specific information whether the mobile device 100 is allowed to establish connection or not. For example, when the device-specific information indicates that the user does not belong to the department to which the MFP 200 belongs, the MFP 200 determines that the mobile device 100 is not allowed to establish the connection. When the WFD connection is allowed (S202: YES), the CPU 31 at S203 transmits a response to the handover request which contains the WFD connection information and a command for allowing WFD connection. The CPU 31 at S204 establishes WFD wireless communication with the mobile device 100 and at S205 receives the print job transmitted from the mobile device 100. When having received the print job, the CPU 31 at S206 starts printing the print data. Upon completion of printing of all pages, the WFD connection with the MFP 200 is disconnected, and the flow in FIG. 5 ends.

On the other hand, when the WFD connection is not allowed (S202: NO), the MFP 200 at S207 uses NFC to send the mobile device 100 a response to the handover request which contains a command for not allowing WFD connection. The CPU 31 then temporarily stops the NFC communication and at S208 determines whether NFC wireless communication is established or not to establish NFC wireless communication again. When the NFC wireless communication is not established (S208: NO), the CPU 31 at S209 controls the operation panel 40 to display the message "Place Mobile Device Near NFC IF" to prompt the user to bring the mobile device 100 into close proximity of the NFC interface 37 of the MFP 200.

When the NFC wireless communication is established (S208: YES), the MFP 200 at S210 uses NFC to receive the alternative server information transmitted from the mobile device 100. The MFP 200 at S211 determines whether the alternative server specified by the received alternative server information is connectable or not. When the alternative server is connectable (S211: YES), the MFP 200 at S212 uses NFC to send the mobile device 100 an alternative-server connection response containing the command indicating that the alternative server is connectable. The CPU 31 then temporarily stops the NFC communication and at S213 determines whether NFC wireless communication is established or not to establish NFC wireless communication again. When the NFC wireless communication is not established (S213: NO), the CPU 31 at S214 controls the operation panel 40 to display the message "Place Mobile Device Near NFC IF" to prompt the user to bring the mobile device 100 into close proximity of the NFC interface 37 of the MFP 200.

When the NFC wireless communication is established (S213: YES), the MFP 200 at S215 uses NFC to receive the URL for obtaining the print job transmitted from the mobile device 100 and uses the wireless LAN interface 38 or the wired LAN interface 39 to download the print job stored in the area indicated by the received URL. Upon completion of the download of the print job, the MFP 200 at S206 starts printing the print data. Upon completion of printing of all pages, the WFD connection with the MFP 200 is disconnected, and the flow in FIG. 5 ends.

When the alternative server specified by the received alternative server information is not connectable (S211: NO), the MFP 200 at S216 uses NFC to send the mobile device 100 an alternative-server connection response containing a command indicating that the alternative server is not connectable. The CPU 31 at S217 determines whether or not the MFP 200 has received, using NFC, the terminating request transmitted from the mobile device 100. When the MFP 200 has not received the terminating request, that is, when the next alternative server information is present (S217: NO), the NFC communication is temporarily stopped, and this flow returns to S208. When the MFP 200 has received the terminating request (8217: YES), the print processing is suspended, and the flow in FIG. 5 ends.

<Procedure of Data Communication Between Devices>

Figure 6:
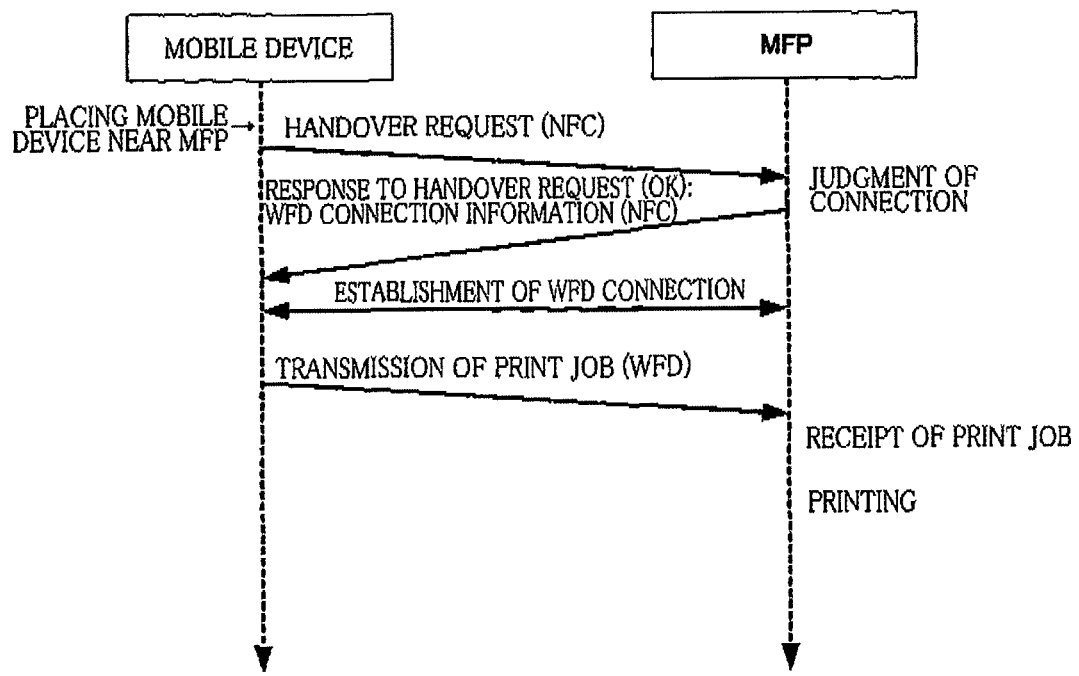
FIG. 6 is a sequence diagram illustrating a procedure of data communication between the mobile device and the MFP.
Figure 7:
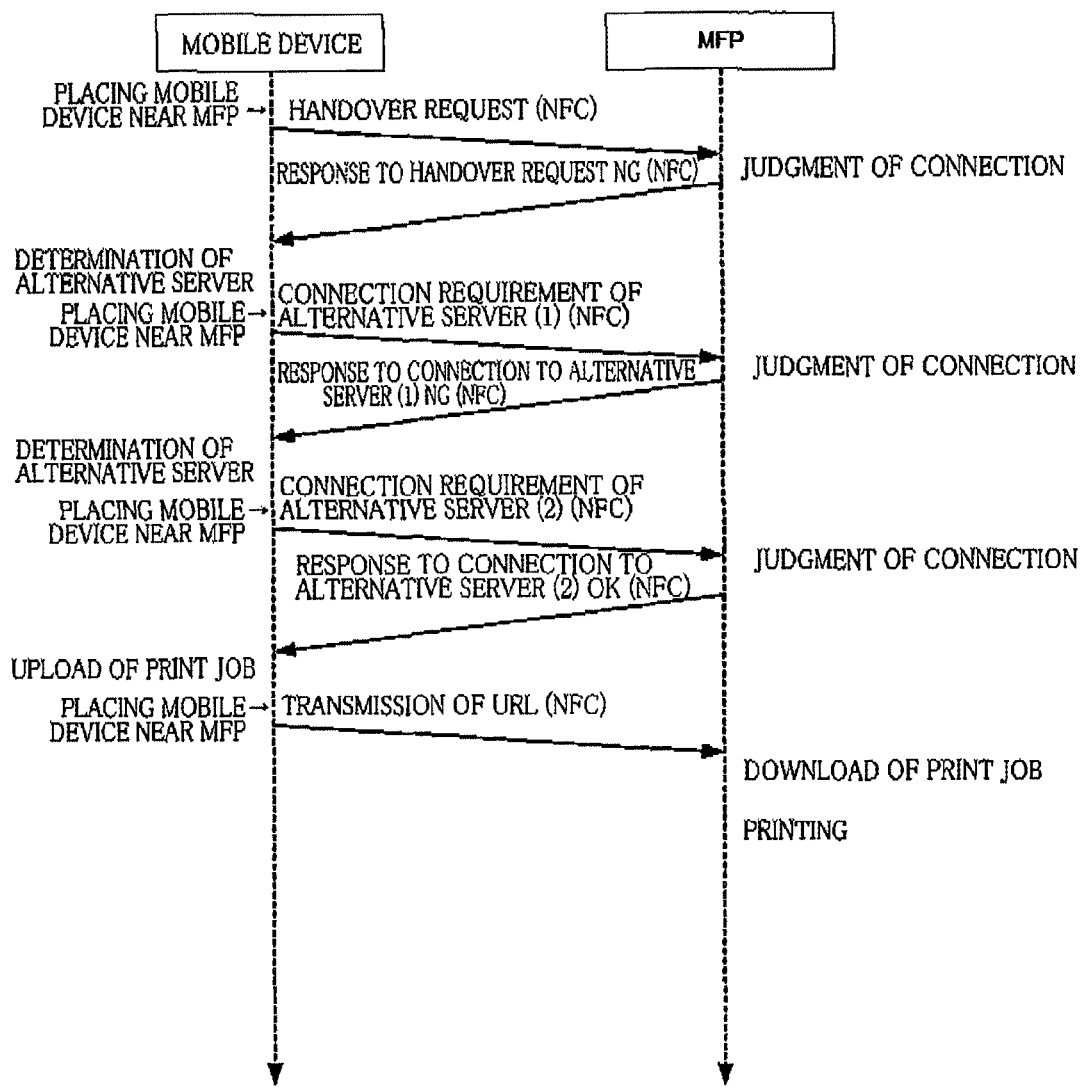
FIG. 7 is a sequence diagram illustrating a procedure of data communication between the mobile device and the MFP.

There will be next explained a data communication procedure between the mobile device 100 and the MFP 200 with reference to FIGS. 6 and 7. As illustrated in FIG. 6, the mobile device 100 activates the print command program 54c, and the user selects image data to be printed from the list of images based on the image data to register a print job. The user then brings the mobile device 100 into close proximity of the NFC interface 37 of the MFP 200 to establish the NFC wireless communication. The mobile device 100 uses NFC to transmit the request of handover to the MFP 200. When the WFD connection is allowed, the MFP 200 having received the request of handover uses NFC to send the mobile device 100 the response to the handover request to which the WFD connection information is attached. When the response to the handover request to which the WFD connection information is attached is received by the mobile device 100, connection information is transferred using NFC between the mobile device 100 and the MFP 200 to establish the WFD wireless communication. The mobile device 100 then uses WED to transmit the print job to the MFP 200. Having received the print job, the MFP 200 performs printing based on the print job.

As illustrated in FIG. 7, as in the above-described example, when the WFD connection is not allowed, the MFP 200 having received the request of handover uses NFC to send the mobile device 100 the response to the handover request which contains the command for not allowing WFD connection. Having received the response to the handover request which contains the command for not allowing WED connection, the mobile device 100 selects alternative server information (1) having the highest priority from the stored alternative server information and uses NFC to transmit the alternative server information (1) to the MFP 200. Having received the alternative server information (1), the MFP 200 determines whether an alternative server relating to the alternative server information (1) is connectable or not. When the alternative server relating to the alternative server information (1) is not connectable, the MFP 200 uses NEC to send the mobile device 100 the alternative-server connection response containing the command indicating that the alternative server is not connectable. When having received the alternative-server connection response containing the command indicating that the alternative server is not connectable, the mobile device 100 sends the MFP 200 alternative server information (2) having the highest priority next to the alternative server information (1). Having received the alternative server information (2), the MFP 200 determines whether an alternative server relating to the alternative server information (2) is connectable or not. When the alternative server relating to the alternative server information (2) is connectable, the MFP 200 uses NFC to send the mobile device 100 the alternative-server connection response containing the command indicating that the alternative server is connectable. When having received the alternative-server connection response containing the command indicating that the alternative server is connectable, the mobile device 100 uploads the print job to the alternative server relating to the alternative server information (2) and uses NFC to send the MFP 200 the URL that is obtained upon the upload and that indicates the area storing the print job. The MFP 200 having received the URL downloads the print job based on the URL and executes printing based on the downloaded print job.

In the image processing system 900 according to the present embodiment described above, the connection information about the MFP 200 is given only to the mobile device 100 storing particular device-specific information, and WFD communication is performed. This configuration can prevent lower security of a network to which the MFP 200 is connected.

Also, the mobile device 100 transmits the alternative server information to the MFP 200, the MFP 200 sends the mobile device 100 the information about whether the alternative server is connectable or not, and the mobile device 100 transmits and receives the print job via the alternative server to which the MFP 200 can be connected. Accordingly, the print job can be reliably transmitted from the mobile device 100 to the MFP 200.

The mobile device 100 sends the MFP 200 the URL obtained upon the upload of the print job to the alternative server. This configuration can use a server that provides a URL only after an upload. Also, the mobile device 100 uses NFC to transmit a URL. Thus, even in a case where the MFP 200 has determined that the MFP 200 is not allowed to establish a WFD connection with the mobile device 100, the mobile device 100 can transmit the URL to the MFP.

Since the mobile device 100 includes the telephone line communicating portion 60, the mobile device 100 can use the public switched telephone network to be connected to the alternative server, resulting in the larger number of usable alternative servers.

While the embodiment of the present invention has been described above, it is to be understood that the invention is not limited to the details of the illustrated embodiment, but may be embodied with various changes and modifications, which may occur to those skilled in the art, without departing from the spirit and scope of the invention. For example, in the above-described embodiment, the mobile device 100 stores the alternative server information and inquires of the MFP 200 whether the selected alternative server is connectable or not. However, the MFP may store the alternative server information and inquire of the mobile device whether the selected alternative server is connectable or not.

Also, the mobile terminal for inputting the print job only needs to be a device capable of performing wireless communication and controlling an image processing device, and a smartphone, a tablet PC, and other similar devices are applicable as the mobile device 100. Also, the image processing device may have an image processing function, and not only the MFP 200 but also a copying machine, a printer, a scanner, and a facsimile machine may be employed as the image processing device. Also, the mobile device 100 may be connected to the external file server 500 through Wi-Fi wireless communication via the wireless LAN I/F. When the mobile device 100 cannot be connected to the router 600 in the LAN to which the MFP 200 is connected, the mobile device 100 only needs to be connected to the external file sewer 500 over a public wireless LAN network.

NFC is employed as a short-distance communication, WFD is employed as a long-distance communication, and a handover is performed from NFC to WFD in the above-described embodiment. However, a communication method of the handover is not limited to these methods. That is, two communication methods that differ from each other in communication distance are only needed, and examples of other communication methods include Bluetooth®, TransferJet, and non-direct WiFi® that executes communication via access points.

Also, the processings in the above-described embodiment may be executed by hardware such as a single CPU, a plurality of CPUs, and an ASIC or combination thereof. Also, the processings in the above-described embodiment may be executed in various forms such as a storage media storing instructions for executing the processings and methods for executing the processings. Also, the mobile terminal may store the image data and the device-specific information about the mobile terminal in the same memory. While the print job is uploaded to the alternative sewer in the above-described embodiment, the image data may be uploaded.

What is claimed is:

1. An image recording system comprising:
a mobile terminal; and
an image recording apparatus configured to record an image on a recording medium,
the mobile terminal comprising:
a first storage configured to store one or more sets of image data;
a second storage configured to store device-specific information about the mobile terminal;
a mobile-terminal-side first communication device configured to perform first wireless communication that is established when a distance between a sender device and a receiver device is equal to or less than a communicable distance;
a mobile-terminal-side second communication device configured to perform second wireless communication that is established based on device-specific information about a sender device and a receiver device and that is greater in communication speed than the first wireless communication; and
a first controller,
the image recording apparatus comprising:
a recording device configured to record an image on the recording medium based on the image data;
a third storage configured to store apparatus-specific information about the image recording apparatus;
an image-recording-apparatus-side first communication device configured to perform the first wireless communication;
an image-recording-apparatus-side second communication device configured to perform the second wireless communication; and
a second controller,
the first controller of the mobile terminal being configured to:
control the mobile-terminal-side first communication device to perform the first wireless communication;
control the mobile-terminal-side second communication device to perform the second wireless communication;
select at least one set of image data from among the one or more sets of image data stored in the first storage, as object image data based on which an image is to be recorded on the recording medium;
transmit the device-specific information about the mobile terminal which is stored in the second storage, to the image recording apparatus through the first wireless communication; and
after the object image data is selected, transmit the object image data to one of the image recording apparatus and a server that is communicable with the image recording apparatus and the mobile terminal,
the second controller of the image recording apparatus being configured to:
control the image-recording-apparatus-side first communication device to perform the first wireless communication;
control the image-recording-apparatus-side second communication device to perform the second wireless communication;
when the device-specific information about the mobile terminal is received by the image recording apparatus through the first wireless communication, determine whether the image recording apparatus is to communicate with the mobile terminal through the second wireless communication;
when the second controller has determined that the image recording apparatus is to communicate with the mobile terminal through the second wireless communication, transmit the apparatus-specific information about the image recording apparatus to the mobile terminal through the first wireless communication; and when the second controller has determined that the image recording apparatus is not to communicate with the mobile terminal through the second wireless communication, transmit non-communication information to the mobile terminal through the first wireless communication, the non-communication information indicating that the image recording apparatus is not to communicate with the mobile terminal through the second wireless communication, the first controller of the mobile terminal being configured to:

when the mobile terminal has received the apparatus-specific information about the image recording apparatus through the first wireless communication, transmit the object image data to the image recording apparatus through the second wireless communication; and when the mobile terminal has received the non-communication information through the first wireless communication, transmit the object image data to the server through one of the second wireless communication and first alternative communication that differs from each of the first wireless communication and the second wireless communication, the second controller of the image recording apparatus being configured to:

when the second controller has determined that the image recording apparatus is to communicate with the mobile terminal through the second wireless communication, after transmission of the apparatus-specific information about the image recording apparatus to the mobile terminal, receive the object image data from the mobile terminal through the second wireless communication and control the recording device to record an image based on the object image data received from the mobile terminal; and when the second controller has determined that the image recording apparatus is not to communicate with the mobile terminal through the second wireless communication, after transmission of the non-communication information to the mobile terminal through the first wireless communication, receive the object image data from the server through one of the second wireless communication and second alternative communication that differs from each of the first wireless communication, the second wireless communication, and the first alternative communication and control the recording device to record an image based on the object image data received from the server.

2. The image recording system according to claim 1, wherein one of the mobile terminal and the image recording apparatus is configured to transmit inquiry information to the other of the mobile terminal and the image recording apparatus through the first wireless communication, and the inquiry information is information for inquiring whether communication between (i) the server communicable with the one of the mobile terminal and the image recording apparatus and (ii) the other of the mobile terminal and the image recording apparatus is possible, wherein the other of the mobile terminal and the image recording apparatus is configured to, upon receiving the inquiry information through the first wireless communication, transmit response information to the one of the mobile terminal and the image recording apparatus through the first wireless communication, and the response information is information indicating whether communication between the server and the other of the mobile terminal and the image recording apparatus is possible, and wherein the first controller of the mobile terminal is configured to transmit the object image data to a server that is, according to the response information, communicable with the other of the mobile terminal and the image recording apparatus.

3. The image recording system according to claim 2, wherein the first controller of the mobile terminal is configured to transmit address information to the image recording apparatus through the first wireless communication, and the address information is indicative of a location in which the object image data transmitted to the server is stored.

4. The image recording system according to claim 3, wherein the first controller of the mobile terminal is configured to, after transmitting the object image data to the server, receive the address information from the server and transmit the received address information to the image recording apparatus.

5. The image recording system according to claim 1, wherein the first alternative communication is communication using a public switched telephone network, wherein the mobile terminal further comprises a third communication device configured to perform the first alternative communication, and wherein the first controller of the mobile terminal controls the third communication device to perform the first alternative communication.

6. The image recording system according to claim 1, wherein one of the mobile terminal and the image recording apparatus has information about a plurality of servers each as the server, and priorities are assigned respectively to the plurality of servers, wherein the one of the mobile terminal and the image recording apparatus is configured to transmit first inquiry information to the other of the mobile terminal and the image recording apparatus through the first wireless communication, and the first inquiry information is information for inquiring whether communication between one server assigned the highest priority among the plurality of servers and the other of the mobile terminal and the image recording apparatus is possible, wherein the other of the mobile terminal and the image recording apparatus is configured to, upon receiving the first inquiry information through the first wireless communication, transmit first response information to the one of the mobile terminal and the image recording apparatus through the first wireless communication, and the first response information is information indicating whether communication between the one server assigned the highest priority and the other of the mobile terminal and the image recording apparatus is possible, and wherein the first controller of the mobile terminal is configured to transmit the object image data to the one server assigned the highest priority when the first response information indicates that the communication between the one server assigned the highest priority and the other of the mobile terminal and the image recording apparatus is possible.

7. The image recording system according to claim 6, wherein the plurality of servers comprise: a first server disposed in a LAN to which the image recording apparatus is connected, and communicable with the mobile terminal and the image recording apparatus; and
a second server disposed outside the LAN and communicable with the mobile terminal and the image recording apparatus, and wherein the priority of the first server is higher than that of the second server.

8. The image recording system according to claim 1,
wherein the plurality of servers comprise: a first server disposed in a LAN to which the image recording apparatus is connected, and communicable with the mobile terminal and the image recording apparatus; and
a second server disposed outside the LAN and communicable with the mobile terminal and the image recording apparatus,
wherein the first controller of the mobile terminal is configured to:
when the mobile terminal has received the apparatus-specific information about the image recording apparatus through the first wireless communication, transmit the object image data to the image recording apparatus through direct wireless communication, the direct wireless communication being established as the second wireless communication to transfer information directly between the mobile terminal and the image recording apparatus; and
when the mobile terminal has received the non-communication information through the first wireless communication, transmit the object image data to the first server through particular wireless communication different from the direct wireless communication, the particular wireless communication being established as the second wireless communication.

9. The image recording system according to claim 1,
wherein the plurality of servers comprise: a first server disposed in a LAN to which the image recording apparatus is connected, and communicable with the mobile terminal and the image recording apparatus; and
a second server disposed outside the LAN and communicable with the mobile terminal and the image recording apparatus,
wherein the first controller of the mobile terminal is configured to:
when the mobile terminal has received the apparatus-specific information about the image recording apparatus through the first wireless communication, transmit the object image data to the image recording apparatus through direct wireless communication, the direct wireless communication being established as the second wireless communication to transfer information directly between the mobile terminal and the image recording apparatus; and
when the mobile terminal has received the non-communication information through the first wireless communication, transmit the object image data to the second server through the first alternative communication that differs from each of the first wireless communication and the second wireless communication.

10. The image recording system according to claim 1,
wherein the plurality of servers comprise: a first server disposed in a LAN to which the image recording apparatus is connected, and communicable with the mobile terminal and the image recording apparatus; and
a second server disposed outside the LAN and communicable with the mobile terminal and the image recording apparatus,
wherein the first controller of the mobile terminal is configured to:
when the mobile terminal has received the apparatus-specific information about the image recording apparatus through the first wireless communication, transmit the object image data to the image recording apparatus through direct wireless communication, the direct wireless communication being established as the second wireless communication to transfer information directly between the mobile terminal and the image recording apparatus;
when the mobile terminal has received the non-communication information through the first wireless communication and when the image recording apparatus is communicable with the first server, transmit the object image data to the first server through wireless communication that uses the second wireless communication and differs from the direct wireless communication; and
when the mobile terminal has received the non-communication information through the first wireless communication and when the image recording apparatus is not communicable with the first server and is communicable with the second server, transmit the object image data to the second server through the first alternative communication that differs from each of the first wireless communication and the second wireless communication.

11. An image recording apparatus comprising:
a recording device configured to record an image on a recording medium based on image data;
a storage configured to store apparatus-specific information about the image recording apparatus;
a first communication device configured to perform first wireless communication that is established when a distance between a sender device and a receiver device is equal to or less than a communicable distance;
a second communication device configured to perform second wireless communication that is established based on device-specific information about a sender device and a receiver device and that is greater in communication speed than the first wireless communication; and
a controller configured to:
control the first communication device to perform the first wireless communication;
control the second communication device to perform the second wireless communication;
when the first communication device has received device-specific information about a mobile terminal that communicates with the image recording apparatus, determine whether the image recording apparatus is to communicate with the mobile terminal through the second wireless communication;
when the controller has determined that the image recording apparatus is to communicate with the mobile terminal through the second wireless communication, after transmission of the apparatus-specific information about the image recording apparatus to the mobile terminal through the first wireless communication, receive object image data from the mobile terminal through the second wireless communication and control the recording device to record an image based on the object image data received from the mobile terminal; and
when the controller has determined that the image recording apparatus is not to communicate with the mobile terminal through the second wireless communication, transmit, to the mobile terminal through the first wireless communication, non-communication information indicating that the image recording apparatus is not to communicate with the mobile terminal through the second wireless communication and after transmission of the non-communication information to the mobile terminal, receive the object image data from the server through one of the second wireless communication and alternative communication that differs from each of the first wireless communication and the second wireless communication and control the recording device to record an image based on the object image data received from the server.

12. A non-transitory storage medium storing a plurality of instructions executable by a computer of an image recording apparatus, the image recording apparatus comprising a recording device configured to record an image on a recording medium based on image data; a storage configured to store apparatus-specific information about the image recording apparatus; a first communication device configured to perform first wireless communication that is established when a distance between a sender device and a receiver device is equal to or less than a communicable distance; and a second communication device configured to perform second wireless communication that is established based on device-specific information about a sender device and a receiver device and that is greater in communication speed than the first wireless communication, the plurality of instructions, when executed by the computer, causing the image recording apparatus to:
control the first communication device to perform the first wireless communication;
control the second communication device to perform the second wireless communication;
when the image recording apparatus has received device-specific information about a mobile terminal that communicates with the image recording apparatus, determine whether the image recording apparatus is to communicate with the mobile terminal through the second wireless communication;
when the image recording apparatus has determined that the image recording apparatus is to communicate with the mobile terminal through the second wireless communication, transmit the apparatus-specific information about the image recording apparatus to the mobile terminal through the first wireless communication and after transmission of the apparatus-specific information about the image recording apparatus to the mobile terminal, receive object image data from the mobile terminal through the second wireless communication and control the recording device to record an image based on the object image data received from the mobile terminal; and
when the image recording apparatus has determined that the image recording apparatus is not to communicate with the mobile terminal through the second wireless communication, transmit, to the mobile terminal through the first wireless communication, non-communication information indicating that the image recording apparatus is not to communicate with the mobile terminal through the second wireless communication and after transmission of the non-communication information to the mobile terminal, receive the object image data from a server through one of the second wireless communication and alternative communication that differs from each of the first wireless communication and the second wireless communication and control the recording device to record an image based on the object image data received from the server.

13. A mobile terminal comprising:
a first storage configured to store one or more sets of image data:
a second storage configured to store device-specific information about the mobile terminal;
a first communication device configured to perform first wireless communication that is established when a distance between a sender device and a receiver device is equal to or less than a communicable distance;
a second communication device configured to perform second wireless communication that is established based on device-specific information about a sender device and a receiver device and that is greater in communication speed than the first wireless communication; and
a controller configured to:
control the first communication device to perform the first wireless communication;
control the second communication device to perform the second wireless communication;
select at least one set of image data from among the one or more sets of image data stored in the first storage, as object image data based on which an image is to be recorded on a recording medium;
transmit the device-specific information about the mobile terminal which is stored in the second storage, to an image recording apparatus through the first wireless communication;
when the mobile terminal has received the apparatus-specific information about the image recording apparatus from the image recording apparatus through the first wireless communication, transmit the object image data to the image recording apparatus through the second wireless communication; and
when the mobile terminal has received, from the image recording apparatus through the first wireless communication, non-communication information indicating that communication between the image recording apparatus and the mobile terminal is not to be performed through the second wireless communication, transmit the object image data to a server communicable with the image recording apparatus, through one of the second wireless communication and alternative communication that differs from each of the first wireless communication and the second wireless communication.

14. A non-transitory storage medium storing a plurality of instructions executable by a computer of a mobile terminal, the mobile terminal comprising: a first storage configured to store one or more sets of image data; a second storage configured to store device-specific information about the mobile terminal; a first communication device configured to perform first wireless communication that is established when a distance between a sender device and a receiver device is equal to or less than a communicable distance; and a second communication device configured to perform second wireless communication that is established based on device-specific information about a sender device and a receiver device and that is greater in communication speed than the first wireless communication, the plurality of instructions, when executed by the computer, causing the mobile terminal to:
- control the first communication device to perform the first wireless communication;
- control the second communication device to perform the second wireless communication;
- select at least one set of image data from among the one or more sets of image data stored in the first storage, as object image data based on which an image is to be recorded on a recording medium;
- transmit the device-specific information about the mobile terminal which is stored in the second storage, to an image recording apparatus through the first wireless communication;
- when the mobile terminal has received the apparatus-specific information about the image recording apparatus from the image recording apparatus through the first wireless communication, transmit the object image data to the image recording apparatus through the second wireless communication; and
- when the mobile terminal has received, from the image recording apparatus through the first wireless communication, non-communication information indicating that communication between the image recording apparatus and the mobile terminal is not to be performed through the second wireless communication, transmit the object image data to a server communicable with the image recording apparatus, through one of the second wireless communication and alternative communication that differs from each of the first wireless communication and the second wireless communication.

* * * * *